Oct. 30, 1962 V. C. WILSON 3,061,738
NORMALLY SUPERCONDUCTING CRYOTRON MAINTAINED
RESISTIVE BY FIELD PRODUCED FROM
PERSISTENT CURRENT LOOP
Filed Oct. 30, 1958
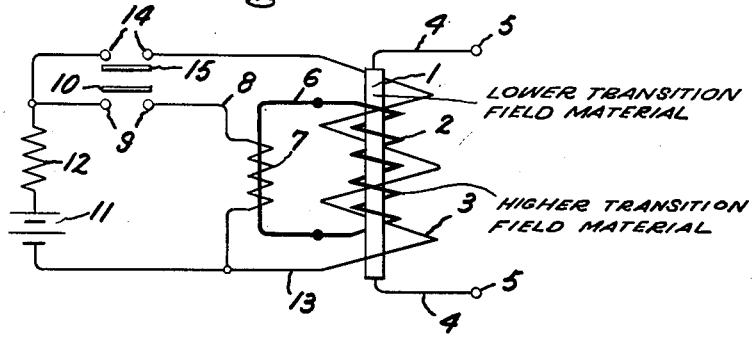
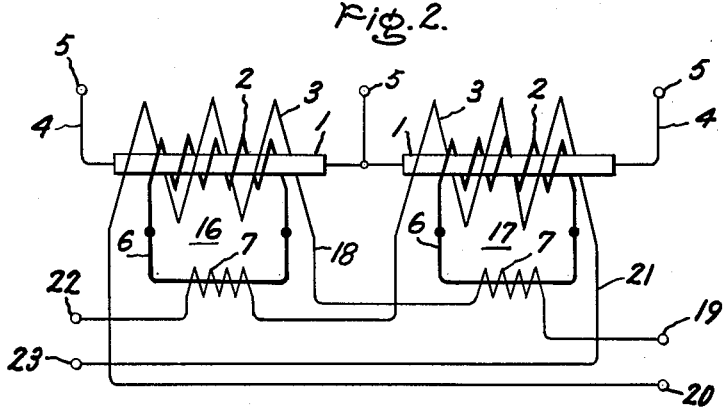
Inventor:
Volney C. Wilson,
by Richard R. Brainard
His Attorney.

3,061,738
NORMALLY SUPERCONDUCTING CRYOTRON MAINTAINED RESISTIVE BY FIELD PRODUCED FROM PERSISTENT CURRENT LOOP
Volney C. Wilson, Scotia, N.Y., assignor to General Electric Company, a corporation of New York
Filed Oct. 30, 1958, Ser. No. 770,750
8 Claims. (Cl. 307—88.5)

The present invention relates to an improved cryogenic electronic device and a bistable circuit in which two of these devices are the active elements.

At temperatures near absolute zero a number of metallic elements and alloys become superconducting, i.e., have zero resistance. Twenty-two metallic elements are known to have this property. When an increasing magnetic field is applied to any one of these superconducting materials, the resistance of the material suddenly increases from zero to the normal resistance at a field value termed the "transition field." This transition field is dependent upon the particular material and its temperature, as well as other factors.

Recently, this transition characteristic has been utilized in electronic elements that I prefer to call cryogenic electronic devices. One of these devices comprises a central superconducting wire of relatively low transition field placed inside a superconducting winding of higher transition field. When a current is conducted through the winding of sufficient magnitude to produce a magnetic field greater than the transition field of the central wire but less than the transition field of the winding, the resistance of the central wire switches from zero to normal resistance while the resistance of the winding remains zero.

These devices are often placed in parallel with a current source and a load. When the central wire is superconducting all of the current passes through it. But when it is resistive the current divides between it and the load.

When one of these prior type cryogenic electronic devices is utilized as a relay or as the active element in a bistable circuit, a holding current is required in the winding to maintain the central wire in a resistive state. Due to this holding current requirement, a large number of these devices are needed for many systems in which cryogenic devices are used.

In the copending application Ser. No. 770,749 of R. H. Pry, filed concurrently herewith, there is described and claimed a cryogenic electronic device that provides its own holding current. My invention is a modification of this device which performs the same function, but with increased sensitivity.

Accordingly, an object of the present invention is to provide an improved cryogenic electronic device.

Another object is to provide an improved cryogenic electronic device which can be maintained resistive without an external current supply.

A further object is to provide an improved bistable cryogenic electronic device circuit.

These and other objects are achieved in a preferred cryogenic electronic device embodiment of my invention comprising a superconducting cylinder around which are wound two superconducting windings. The cylinder is formed from low transition field material, and the two windings from medium and high transition field material, respectively. The ends of the medium transition field windings are interconnected by a superconducting lead around a portion of which a third winding is wound. A current pulse applied to the high transition field winding produces a magnetic field greater than the transition field of the cylinder and the medium transition field winding thereby causing them to become resistive. When this pulse terminates, the decaying magnetic field induces currents in the medium transition field winding that, when the field decreases below the transition field of this winding, continue to flow indefinitely in the then superconducting winding. This current flow produces a magnetic field greater than the transition field of the cylinder that retains the cylinder in a resistive state. This current flow can be terminated by applying a current pulse to the third winding that restores the resistance in the lead connecting the two ends of the medium transition field winding. This resistance then dissipates the currents in the medium transition field winding thereby permitting the cylinder to become superconducting. Since resistance is retored to only a portion of the circuit that includes the medium transition field winding, this device is more sensitive than one in which the resistance of all this circuit is restored.

The novel features believed characteristic of the invention are set forth in the appended claims. The invention itself, however, together with further objects and advantages thereof may best be understood by reference to the following description, taken in connection with the accompanying drawing, in which:

FIG. 1 is a diagram of a circuit with a preferred cryogenic electronic device embodiment of my invention, and FIG. 2 is a diagram of a bistable circuit in which two cryogenic electronic devices of the FIG. 1 embodiment type are the active elements.

In FIG. 1 I have illustrated a cryogenic electronic device of my invention comprising a cylinder 1 of superconducting material of low transition field surrounded by two windings, 2 and 3, of superconducting material of medium transition field and high transition field, respectively. Windings 2 and 3 may be wound in the same layers or either one may be placed above the other.

Preferably, the transition fields between cylinder 1 and winding 2 and also between windings 2 and 3 differ by a factor of two or more, although the difference may be less. The control of the superconducting states of the individual components is less exacting when there are large differences in the transition fields. Cylinder 1 and windings 2 and 3 may be constructed from, for example, tin, lead, and niobium, respectively. At 3.5° K. the transition fields of these elements are approximately 30 oersteds, 600 oersteds, and 2,000 oersteds, respectively. One of the many other suitable combinations are tantalum, vanadium, and either lead or niobium. At 4.2° K. the transition fields of these materials are approximately 50 oersteds, 330 oersteds, 540 oersteds, and 2,000 oersteds, respectively.

Cylinder 1 is connected by leads 4 to terminals 5 to which a utilization circuit, not shown, may be connected. The two ends of winding 2 are interconnected by a superconducting lead 6 around a portion of which a winding 7 of superconducting material is wound. Winding 7 is connected by leads 8 through a switch, illustrated as two contacts 9 and an armature 10, across the series combination of a source 11 of direct current and a current limiting resistor 12. Winding 3 is connected by leads 13 through a switch, illustrated as two contacts 14 and an armature 15 to this series combination.

The cryogenic electronic device of FIG. 1 is maintained, by means not illustrated, at a very low temperature, which for presently known superconducting materials is in the range of liquid helium or hydrogen temperatures. For example, this device may be submerged in liquid helium contained in a Dewar vessel that is surrounded by liquid nitrogen contained in a larger Dewar vessel. This low temperature arrangement is called a cryostat.

Initially, armatures 10 and 15 are separated from contacts 9 and 14 and the device is completely superconducting. The current flow through winding 3 obtained with the momentary closing of armature 15 against contacts 14 produces an axial magnetic field greater than the transition field of winding 2 and cylinder 1 thereby causing resistance to be restored in these components. When this current flow is terminated the axial magnetic field in decaying induces in winding 2 and lead 6 a current flow that, when the axial field decays below the transition field of winding 2, can continue to flow indefinitely in the then superconducting winding 2. This current flow maintains the axial field only slightly less than the transition field of winding 2 and thus, greater than the transition field of cylinder 1. Cylinder 1 may then remain in the resistive state indefinitely.

Cylinder 1 can be reverted to the superconducting state by closing armature 10 against contacts 9. This completes a circuit for current flow through winding 7 which then produces a magnetic field greater than the transition field of lead 6 thereby causing the portion of lead 6 adjacent winding 7 to become resistive. This resistive portion of lead 6 quickly dissipates the current in winding 2 producing the axial magnetic field. With the dissipation of this current, the axial magnetic field decays to zero.

From the above explanation, it should be evident that for the cryogenic electronic device to function, windings 3 and 7 do not have to be formed from superconducting material. However, if they are superconducting, no energy is dissipated in these windings. If winding 7 is resistive, the superconductivity of lead 6 can be destroyed by Joule heat from current flow through winding 7 instead of by the magnetic field produced thereby.

With this cryogenic electronic device a condition of zero or normal resistance can be created between terminals 5 and maintained indefinitely without holding current supplied from an external source.

If desired, a bundle of superconducting wires can be substituted for cylinder 1, each wire connected to a different pair of terminals 5. The device may then function as a multi-contact self-holding relay.

In FIG. 2 I have illustrated a "flip-flop" circuit in which the active elements are two cryogenic electronic devices 16 and 17 of the FIG. 1 embodiment type. Winding 3 of device 16 is connected by leads 18 in series with the winding 7 of device 17 across two terminals 19 and 20. The winding 3 of device 17 is connected in series by leads 21 with the winding 7 of device 16 across two terminals 22 and 23.

A finite resistance—the resistance of one of these cylinders 1—can be placed across the center terminal 5 and either the left or right terminal 5 by the application of current pulses to terminals 19, 20 or 22, 23. For example, with the cylinder 1 of device 16 initially resistive, a finite resistance exists between the center and the left terminals 5 while zero resistance exists between the center and the right terminals 5. When a current pulse is applied to terminals 22 and 23 it produces a magnetic field in winding 7 of device 16 that destroys the superconductivity of lead 6, the resistance of which then dissipates the currents in winding 2 of device 16. The cylinder 1 of device 16 then reverts to a superconducting state.

This same current pulse, which also flows through winding 3 of device 17, produces a magnetic field that restores the resistance of cylinder 1 of this device 17. Then resistance appears between the center and the right terminals 5 while there is zero resistance between the center and the left terminals 5. Upon termination of this current pulse, the current flow induced in winding 2 of device 17 produces a magnetic field that maintains the resistance of cylinder 1 of device 17.

The circuit can be returned to the original stable state by the application of a current pulse to terminals 19 and 20. The resulting current flow through winding 7 of device 17 destroys the superconductivity of lead 6 of this device 17 thus causing the dissipation of the superconducting current flow in winding 2 that was maintaining the cylinder 1 of device 17 in a resistive state. Consequently, this cylinder 1 reverts to the superconducting state. At the same time this current pulse produces a magnetic field, by passage through winding 3 of device 16, that restores the resistances of winding 2 and cylinder 1 of device 16. When this pulse terminates, the decaying field induces a current flow in winding 2 of device 16 that maintains the axial magnetic field greater than the transition field for cylinder 1 of device 16.

In summary, I have disclosed a cryogenic electronic device embodiment that for bistable operation does not require a holding current from an external source. Instead this device provides its own holding current. When utilized as the active elements in a bistable circuit, only two of my devices are required as compared to the six prior type cryogenic electronic devices required when they are the active elements.

While the invention has been described with respect to certain specific embodiments, it will be appreciated that many modifications and changes may be made by those skilled in the art without departing from the spirit of the invention. I intend, therefore, by the appended claims, to cover all such modifications and changes as fall within the true spirit and scope of my invention.

What I claim as new and desire to secure by Letters Patent of the United States is:

1. A cryogenic electronic device comprising a conductor of superconducting material having a first transition field, two multi-turn windings wound about said first conductor, one of said windings being formed from a superconducting material having a transition field higher than said first transition field and a superconducting lead for completing a circuit with said one of said windings to provide a supercurrent loop.

2. The cryogenic device as defined in claim 1 further including a winding wound about said superconducting lead.

3. The cryogenic device as defined in claim 1 in which the other of said windings is formed of resistive material.

4. A bistable electronic circuit comprising first and second cryogenic electronic devices each comprising a first conductor of superconducting material, a first winding of superconducting material wound about said conductor, said first winding having a higher transition field than the transition field of said conductor, a second winding wound about said conductor, a superconducting lead interconnecting the ends of said first winding, and a third winding wound about a portion of said superconducting lead; leads for connecting in series said third winding of said first cryogenic electronic device and said second winding of said second cryogenic electronic device, leads for connecting in series said second winding of said first cryogenic electronic device and said third winding of said second cryogenic electronic device; and leads connecting in series said conductors of said first and second cryogenic electronic devices.

5. A cryogenic electronic device circuit comprising a conductor of superconducting material, means for momentarily applying a first magnetic field that restores the resistance to said conductor, means responsive to the termination of said first magnetic field for producing a superconducting current flow that produces a second magnetic field for maintaining said conductor resistive, means for providing a current path for said current flow external to said means for producing said current flow, and means for causing said current path to become resistive at a selectable time for dissipating said current flow.

6. A cryogenic electronic device circuit comprising a conductor of superconducting material, means for momentarily applying a first magnetic field that restores the resistance to said conductor, means responsive to the termination of said first magnetic field for producing a self-sustaining superconducting current flow in a path near said conductor for producing a second magnetic field for maintaining said conductor resistive, and means for causing only a portion of said path to become resistive at a selectable time for dissipating said current flow.

7. A cryogenic electronic device comprising a closed loop of superconducting material capable of supporting a persistent loop current, at least a portion of said loop exhibiting a first transition field; circuit means for establishing a persistent current in said closed loop; a second superconductor positioned in a magnetic field produced by said persistent loop current, said second superconductor having a transition field less than the said magnetic field produced by said loop current; and a magnetic means separate from said first mentioned means, positioned for subjecting said portion to a magnetic field greater than said first transition field in order to impede the persistent current in said loop.

8. A cryogenic electronic device comprising a closed loop of superconducting material capable of supporting a persistent loop current, at least a portion of said loop exhibiting a first transition field; means for exciting a persistent current in said closed loop; a second superconductor provided with end conductors and positioned in a magnetic field produced by said persistent loop current, said second superconductor having a transition field less than the said magnetic field produced by said loop current, and a magnetic means remote from said first mentioned means, positioned for subjecting said portion to a magnetic field greater than said first transition field in order to impede the persistent current in said loop.

References Cited in the file of this patent
UNITED STATES PATENTS

| | | |
|---|---|---|
| 2,832,897 | Buck | Apr. 29, 1958 |
| 2,877,448 | Nyberg | Mar. 10, 1959 |
| 2,888,201 | Housman | May 26, 1959 |
| 2,946,030 | Slade | July 19, 1960 |